3,808,224
1-(DIALKYLAMINOALKYL)-5-(3-PHENYL-5-OXA-
2,4-DIAZOLYL)-BIGUANIDES
Jan Marcel Didier Aron-Samuel, 116 Rue Carnot,
92 Suresnes, France
No Drawing. Filed Aug. 11, 1972, Ser. No. 282,194
Claims priority, application Great Britain, Aug. 20, 1971,
39,234/71
Int. Cl. C07d 85/52
U.S. Cl. 260—307 G          4 Claims

ABSTRACT OF THE DISCLOSURE

This invention relates to new oxadiazolyl-biguanides having interesting pharmacological properties that make them therapeutically useful.

These are obtained by reacting a halogenated or trimethylated derivative of a phenyl-oxadiazole with a biguanide derivative.

---

This invention relates to new biguanide derivatives having useful therapeutical properties, to a method for their preparation and to a therapeutic composition containing same as active ingredient.

The new derivatives of this invention have the formula:

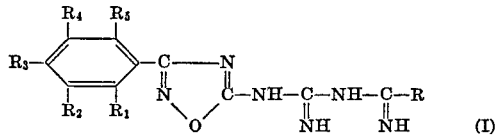
(I)

in which $R_1$, $R_2$, $R_3$, $R_4$ and $R_5$, which may be the same or different, are selected from hydrogen, the halogens, and the alkyl, alkoxy, monohaloalkyl and polyhaloalkyl (particularly trifluoromethyl) groups or, considered in pairs, form an alkylene-dioxy (particularly methylene-dioxy) bridge; and R is (a) a group

in which $R_6$ and $R_7$, which may be the same or different, are each hydrogen or an alkyl or allyl group or a heterocycle (particularly piperidino or morpholino) optionally substituted with at least an alkyl group, or, together with the nitrogen atom to which they are attached, $R_6$ and $R_7$ form a five- or six-membered heterocycle which may optionally contain another heteroatom and which may be substituted with at least an alkyl, allyl, hydroxy, alkoxy, phenyl, alkylphenyl or halophenyl group; or (b) a group:

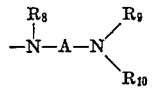

in which $R_8$ is hydrogen or an alkyl group, A is a straight- or branched-chain alkylene group and $R_9$ and $R_{10}$, which may be the same or different, represent each a straight- or branched-chain alkyl group or, together with the nitrogen atom to which they are attached, form a 5-, 6- or 7-membered heterocycle optionally substituted with at least an alkyl group and which may contain another heteroatom.

The invention includes also within its scope the quaternary ammonium derivatives of compounds of the Formula I and the acid addition salts thereof with inorganic and organic acids.

In the derivatives of the invention, the alkyl and alkoxy groups or moieties contain preferably from 1 to 6 carbon atoms.

The alkylene groups contain preferably from 2 to 6 carbon atoms.

The invention relates also to a method for the preparation of derivatives of the Formula I, their salts and quaternary ammonium derivatives, comprising reacting a biguanide of the formula:

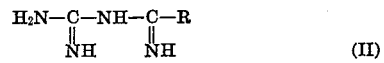
(II)

in which R is as above defined, with an oxidiazole derivative having the formula:

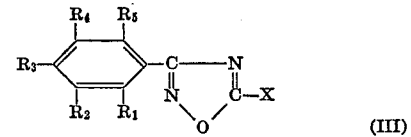
(III)

in which $R_1$, $R_2$, $R_3$, $R_4$ and $R_5$ have the above-defined meanings and X is halogen or a trihalomethyl radical.

Examples of halogens for X or the trihalomethyl group are particularly chlorine, bromine and iodine, chlorine being preferred.

This reaction may be conducted in basic media (such as sodium hydroxide, potassium hydroxide, sodium or potassium carbonate, and the like) within water or alcohols, or preferably in the presence of an aromatic solvent (benzene, toluene, . . . ) or of a halogenated aliphatic solvent (methylene chloride, chloroform . . . ).

Biguanide (II) may be added in salt form (particularly as the hydrochloride). The reaction occurs at moderate temperature.

The resulting bases are generally solids which may be recrystallized from solvents such as alcohols, ethers and nitriles. The products give readily salts with inorganic and organic acids, which may be recrystallized from alcohols by conventional procedures well known to those skilled in the art.

When the derivatives of the Formula I are capable of forming quaternary ammonium derivatives, these will be obtained by conventional procedures also well known to those skilled in the art.

The starting compounds of the Formulae II and III are known products, or may be prepared by known methods, for example by the methods disclosed in the article by M. Noël, R. Prugnard and G. Patereau in C.R. Acad. Sci. Paris 268, 1407–1409, 1969.

The following nonlimiting examples are given to illustrate the method for the preparation of the compounds of the invention.

Table I given after the examples provides a non-limiting list of derivatives of this invention prepared by the above-mentioned method, with their melting points in capillary tube. In the second column, for the purpose of simplicity, only the nature of the substituents of the phenyl nucleus of the oxadiazole derivatives are given when present.

EXAMPLE 1

Into a reactor are added 100 ml. of distilled water, 35 g. of 3-dibutylaminopropyl-biguanide and 30 ml. of methylene chloride. Pure caustic soda lye ($d=1.33$; 30 ml.) is added thereto while maintaining the temperature at 15° C. A solution of 5-chloro-3-phenyl-1,2,4-oxadiazole (18 g.) in methylene chloride (70 ml.) is then added thereto, over 10 minutes. The temperature of the mixture increases to 35° C. The reaction mixture is stirred during one hour. The organic phase is decanted and washed with water (15 ml.), and is then dried over sodium sulfate. The solvent is evaporated off, to give 49 g. of orange oil which is dissolved in acetonitrile (100 ml.). This solution, filtered in the hot, gives on cooling a crystalline precipitate. Thus are obtained 18.9 g. of 1-(3-dibutylaminopropyl)-5-(3-phenyl-5-oxadiazolyl)-biguanide (Derivative LA 2244). M.P.=112–114° C. (capillary tube).

The hydrochloride melts at 163°–165° C.

The fumarate melts at 134°–135° C.

EXAMPLE 2

Into a reactor are added 31 g. of 3-dibutylaminopropyl-biguanide and 60 ml. of acetonitrile. The mixture is warmed to 30° C. and 3-m.chlorophenyl-5-trichloromethyl-1,2,4-oxadiazole (29.7 g.) dissolved in acetonitrile (40 ml.) are added to the resulting solution. Stirring is maintained during 4 hours. The solvent is removed in vacuo and the resulting oil is solidified from absolute alcohol (100 ml.). The resulting solid is recrystallized from acetonitrile (100 ml.), to give 27 g. of 1-(3-dibutylaminopropyl)-5-(3-m.chlorophenyl - 5 - oxadiazolyl)-biguanide (Derivative LA 2258). M.P.=101°–103° C.

EXAMPLE 3

Into a reactor are added 8.3 g. of 1-(3-dibutylaminopropyl)-5-(3-phenyl-5-oxadiazolyl)-biguanide and 25 ml. of acetone. The mixture is warmed until dissolution is complete, and 2.8 g. of methyl iodide are then added thereto. After concentration and working up into acetone (15 ml.), 6 g. of 1-(1-dibutylmethyl-ammonio-3-propyl)-5-(3-phenyl-5-oxadiazolyl)-biguanide are obtained. M.P. 105° C.

TABLE I

| Compound number | Substituent of the phenyl group | R | Form | M.P.,° C., capillary tube |
|---|---|---|---|---|
| LA 2241 | None | —N(CH₃)₂ | Base | 226–227 |
| LA 2263 | do | —N(piperidinyl)-OH | do | 173–174 |
| LA 2261 | do | —N(piperidinyl)(C₆H₄-Cl)(OH) | do | 251 |
| LA 2255 | do | —N(morpholinyl) | do | 223–224 |
| LA 2240 | do | —N(piperazinyl)-CH₃ | do | 216–219 |
| LA 2246 | do | N(piperazinyl)-CH₂-CH=CH₂ | do | 176–177 |
| LA 2248 | do | —N(CH₃)—(CH₂)₂—N(C₂H₅)₂ | do | 136–137 |
| LA 2242 | do | —NH—C₄H₉ | do | 167 |
| LA 2253 | do | —NH—CH₂—CH=CH₂ | do | 168–169 |
| LA 2256 | do | —NH—(CH₂)—N(C₄H₉)₂ | do | 94–96 |
| LA 2247 | do | —NH—CH(CH₃)—CH₂—N(CH₃)₂ | do | 147–148 |
| LA 2254 | do | —NH—(CH₂)₂—N(piperidinyl) | do | 153–154 |
| LA 2243 | do | —NH—(CH₂)₃—N(C₂H₅)₂ | do | 110–112 |
| LA 2252 | do | —NH—(CH₂)₃—N(C₃H₇)₂ | do | 100–102 |
| LA 2244 | do | —NH—(CH₂)₃—N(C₄H₉)₂ | Base / Hydrochloride / Fumarate | 112–114 / 163–165 / 134–135 |
| LA 2259 | R₃=F | —NH—(CH₂)₃—N(C₄H₉)₂ | Base | 120 |
| LA 2258 | R₂=Cl | —NH—(CH₂)₃—N(C₄H₉)₂ | do | 101–103 |
| LA 2251 | None | —NH—(CH₂)₃—N(pyrrolidinyl) | do | 162–164 |

TABLE I—Continued

| Compound number | Substituent of the phenyl group | R | Form | M.P.,° C., capillary tube |
|---|---|---|---|---|
| LA 2260 | do | —NH—(piperidinyl with C₂H₅ on N) | do | 193–195 |
| LA 2257 | do | —NH—CH(CH₃)—(CH₂)₃—N(C₂H₅)₂ | do | 134–135 |
| LA 2101 | do | —NH—(CH₂)₃—N⁺(C₄H₉)(CH₃)(C₄H₉), Br⁻ | Quaternary ammonium salt. | 143–145 |
| LA 2100 | do | —NH—(CH₂)₃—N⁺(C₄H₉)(CH₃)(C₄H₉), I | do | 105 |
| LA 2264 | R₃=CH₃ | —N(piperazinyl)N—CH₃ | Base | 203 |
| LA 2265 | R₃=Cl | —NH—(CH₂)₃—N(C₄H₉)₂ | do | 137–138 |

Among the derivatives listed in Table I, the following are particularly interesting:

1-(3-dibutylaminopropyl)-5-(3-phenyl-5-oxadiazolyl)-biguanide (LA 2244);
1-morpholino-5-(3-phenyl-5-oxadiazolyl)biguanide (LA 2255);
1-(5-diethylamino-2-pentyl)-5-(3-phenyl-5-oxadiazolyl)-biguanide (LA 2257);

the biguanide derivative (LA 2255) of formula

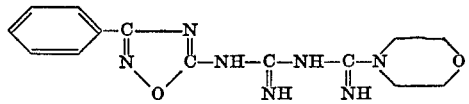

(LA 2258) and the biguanide derivative (LA 2261) of formula

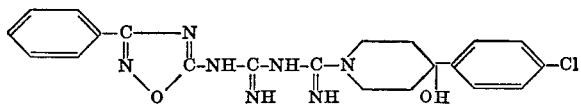

Among the biguanides of the Formula II used for the preparation of the derivatives of the Formula I set forth in Table I above, some are new chemical compounds.

Said new biguanides are the following:

(1) 3-(N-ethyl-piperidinyl)-biguanide trihydrochloride, having the formula:

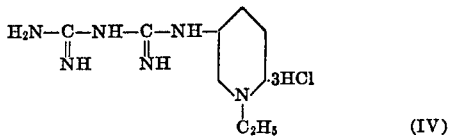

M.P. (cap.)=253.5° C.

(2) The biguanide having the formula:

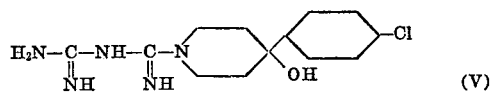

M.P. (cap.)=240–242° C.

(3) (5 - diethylamino-2-pentyl)-biguanide (carbonate) having the formula:

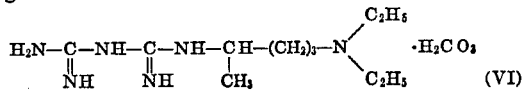

M.P.=125° C. (dec.).

Results of a pharmacological and toxicological investigation conducted with derivatives of the Formula I will be set forth below for illustrative purposes.

(I) Pharmacological investigation (1) Spasmolytic effect: This effect was evidenced by the following techniques:

(a) On the isolated duodenum of rat: As an example, 0.5 γ/ml. of LA 2244 opposes the contraction of the duodenum of rat produced by 50 γ/ml. of barium chloride, whereas 3 γ/ml. of papaverine are required to produce this action. All other products of the series exhibit this property, to varying degrees.

Also, 0.5 γ/ml. of LA 2244, LA 2259, LA 2265, LA 2100 or LA 2101 opposes the contraction of the duodenum of rat produced by 0.1 γ/ml. of acetylcholine, whereas 7.5 γ/ml. of papaverine are required to produce this action. All the other products of the series exhibit this property, to varying degrees.

(b) On the gall bladder of anesthetized guinea-pig: it was noted, according to the method of J. R. Boissier and J. J. Chivot (J. Physiol. Paris, 51, 408–409 (1959)) that, on intraduodenal injection, the products of the invention relieve the spasm induced by a 10 γ/kg. carbachol dose injected by the intravenous route. The results obtained are set forth in following Table II. In fact, the effects on the biliary system are not limited to an antispasmodic action. There exists concomitantly a true increase of the biliary rate of flow and, thus, a stimulation of choleresis.

(c) On the spontaneous contractions of the uterus of the female rat, in situ, LA 2244 at a dosage of 2 mg./kg. i.v. produces a 70% decrease of the amplitude of the spontaneous contractions during 30 minutes.

Method according to Langenhorn and Schmidt: On the contractions of the uterus of the female rat, in situ, induced by a 40 γ/kg. i.v. methergine injection, LA 2244 at a dosage of 2 mg./kg. i.v. produces a 70% decrease of the amplitude of the contractions during a period of time of 90 minutes.

The other products of the Formula I give comparable results under the same conditions.

(d) On the isolated heart of rabbit or guinea-pig perfused through the aorta by the retrograde route, according to Langendorff's technique, there is noted, with said compounds, an increase of the coronary rate of flow which is powerful, extended, and highly superior to that of the reference materials.

TABLE II

| | Controls | LA 2244, 50 mg./kg. intraduodenal | LA 2257, 100 mg./kg. intraduodenal | LA 2258, 100 mg./kg. intraduodenal | LA 2259, 100 mg./kg. intraduodenal | LA 2261, 100 mg./kg. intraduodenal | LA 2261, 100 mg./kg. oral route | LA 2100, 100 mg./kg. intraduodenal |
|---|---|---|---|---|---|---|---|---|
| Time to apparent interruption of the perfusion. | 4–7 min | 0 | 0 | 0 | 0 | 0 | 0 | 0 |
| Duration of this interruption. | 4–9 min | Decrease of the rate of flow, but no interruption. | Ditto in only 2/4. | Ditto in all animals. | Slight decrease of the rate of flow. | 0 | 0 | Decrease of the rate of flow, but no interruption. |
| Delay for total resumption of the rate of flow. | 10–16 min | 5 min | 8 min | 14 min | 11 min | Subsequent rate of flow is slightly higher. | | 8 min |

Thus, at 1 γ/ml., LA 2244 opposes totally the coronary-constrictive action of 100 γ/ml. of barium chloride, and reverses this action at 10 γ/ml.

The results obtained are set forth in Table III.

TABLE III

| | Percent |
|---|---|
| Action of $BaCl_2$ 100 γ/ml. on the coronary rate of flow | −40 |
| Action of a mixture of $BaCl_2$ 100 γ/ml. and LA 2244 at 1 γ/ml. on the coronary rate of flow | 0 |
| Action of a mixture of $BaCl_2$ 100 γ/ml. and LA 2244 at 10 γ/ml. on the coronary rate of flow | +50 |
| Action of a mixture of $BaCl_2$ 100 γ/ml. and papaverine at 1 γ/ml. on the coronary rate of flow | −20 |
| Action of a mixture of $BaCl_2$ at 100 γ/ml. and papaverine at 10 γ/ml. on the coronary rate of flow | +25 |

Also, in coronary perfusion experiments, LA 2265 exhibits a vasodilator activity superior to that of papaverine.

(2) Analgesic and anti-inflammatory effect: This effect was evidenced by means of the following tests:

(a) On pain induced in mice by an intraperitoneal injection of 3% acetic acid, the derivatives of the Formula I produce an analgesia which is at least equal and frequently superior to that of acetyl salicylic acid at an equivalent dosage. Thus, LA 247, LA 2248, LA 2251 and LA 2265 have an effect comparable with that of acetyl salicylic acid at dosages that are from 2 to 5 times lower.

(b) On exudation produced in mice by the intra-pleural injection of an aqueous 5‰ Evans Blue solution (Weisbach Method, J. Med. Chem. 6, 91 (1963)), the subcutaneous injection of the derivatives of this invention is followed by a decrease in the volume of the exudate.

(c) On the oedema induced by injection in the rat's paw of a 1% carrageenate suspension, ingestion of 100 mg./kg. of LA 2244 is followed by a 52% decrease of the oedema.

The other derivatives of the Formula I produce similar effects, at varying degrees.

At the same dosage, the decrease produced on the oedema by phenylbutazone is only 40%.

(3) Anti-malarial action.—On oral administration at a dosage of 200 mg./kg., LA 2244, LA 2258 and LA 2259 prevent the death of mice infested with *Plasmodium berghei* (A. Quevauviller and J. W. Louw, Ann. Pharm. Fr., 13, 20 (1955)).

(4) Protective action against strychnine: Derivatives LA 2241 and LA 2255 have a substantial protective action against convulsions and death produced by the injection of strychnine. For example: the following results were obtained on lots of 10 reference mice administered 1.5 mg./kg. of strychnine by the intraperitoneal route:

| | Convulsions | Dead |
|---|---|---|
| Reference animals | 10 | 6 |
| LA 2241 (100 mg./kg. per os) | 3 | 1 |
| LA 2241 (200 mg./kg. per os) | 1 | 0 |
| Reference animals | 9 | 9 |
| LA 2255 (100 mg./kg. per os) | 7 | 7 |
| LA 2255 (200 mg./kg. per os) | 1 | 1 |

This is an effect produced at the level of muscular contractility, since Cardiazol(pentylenetetrazole)-induced conpulsions, chloral- and hexobarbital-induced sleep, activity, and equilibrium on a rotating rod are not influenced by said derivatives.

The decerebrate rigidity induced in rat by section of the nervous system between the bulb and the mesocephalon is suppressed during one hour by LA 2255 (200 mg./kg. per os).

(II) Toxicological investigation

The derivatives of the Formula I have low toxicity and there exists a substantial margin of safety between the therapeutic doses and the toxic doses.

The $LD_{50}$, calculated according to the method of Kärber and Behrens, is given in mg./kg. in the following Table IV.

TABLE IV

| Product | Oral route | Subcutaneous route | Intraperitoneal route |
|---|---|---|---|
| LA 2243 | 1,200 | 900 | 320 |
| LA 2244 | 1,500 | >4,000 | 240 |
| LA 2246 | >1,000 | >500 | 300 |
| LA 2247 | 500 | 300 | |
| LA 2248 | 200 | 500 | 150 |
| LA 2251 | 800 | 700 | |
| LA 2252 | 500 | 500 | 160 |
| LA 2253 | 350 | 800 | |
| LA 2254 | 500 | 180 | |
| LA 2255 | >1,000 | >1,000 | |
| LA 2256 | >1,000 | >100 | |
| LA 2257 | 900 | 500 | |
| LA 2258 | 1,250 | >500 | |
| LA 2259 | >1,000 | 1,080 | 75 |
| LA 2260 | >1,500 | 1,050 | >500 |
| LA 2261 | >2,000 | >500 | >500 |
| LA 2100 | >2,000 | 450 | 35 |
| LA 2241 | >1,000 | >1,000 | |
| LA 2265 | >1,000 | >1,000 | |

Chronic toxicity was studied in young rats with LA 2244 during a period of time of 3 months, at dosages of 10 mg./kg., 50 mg./kg. and 200 mg./kg., by the oral route.

No effect was noted on growth, on the weight of the organs, on the blood count and the blood picture, on azotemia.

Histological slides obtained from the heart, the lungs, the spleen, the liver, the suprarenal glands, the genital glands, the kidneys, the stomach, from a segment of the small and large intestines, from the thyroid, the bladder and the pancreas show the integrity of such organs.

It is apparent from the above investigation that the derivatives of the Formula I possess therapeutically useful properties.

Thus, they are useful for the relief of spasms of the unstriated muscles and the syndromes they produce.

On administration to man in the form of capsules (400 mg.) and of suppositories (200 mg.) LA 2244 was found to have an outstanding activity in painful syndromes of colitis, of biliary colic, of hiatal hernia, of premenstrual pains and in two atrociously painful cases of pancreatitis. Tolerance was perfect and the derivative was found to be free from the defects (such as dryness of the mouth, disorders of the accommodation, and the like) of usual antispasmodic drugs of atropine type.

Said derivatives are also useful in the treatment of malaria. Finally, their anti-inflammatory activity permits their use in the various forms of rheumatism.

In addition, tests carried out with LA 2255 during neurological contractures gave satisfactory results.

Thus, the invention relates also to a therapeutic composition comprising, as active ingredient, a derivative of aforementioned Formula I, or a quaternary ammonium derivative or a pharmaceutically acceptable salt of the derivative of the Formula I, together with a pharmaceutically acceptable carrier.

The composition may be formulated for oral, rectal or parenteral administration, the active ingredient being combined with the usual pharmaceutical carrier or excipients.

Thus, for oral administration, the composition may be formulated for example as tablets, coated tablets, granules, capsules, syrups and drinkable solutions. It may be interesting to coat the tablets with an enteric or non-enteric coating.

For rectal administration, the composition may be formulated as suppositories with the conventional vehicles, such as cocoa butter and its synthetic substitutes.

For parenteral administration, the composition may be formulated in ampoules or vials containing a solution or suspension of the active ingredient in sterile liquids, for example isotonic aqueous solutions, or oils.

In the unit dosage forms of the composition, such as tablets, suppositories or ampoules injectable by any other route than the intravenous route, the derivative, or its salt, or its quaternary ammonium derivative, comprising the active ingredient, will be used generally at unit doses of from about 25 mg. to about 900 mg.

A daily dosage regimen will be, for example, from 150 mg. to 5 g. of active ingredient by the oral or rectal route, and from 1 mg. to 100 mg., particularly from 25 mg. to 100 mg., by the parenteral route.

Having now described my invention what I claim as new and desire to secure by Letters Patent is:

1. A biguanide derivative selected from the group consisting of a compound of the formula

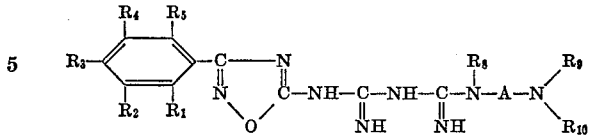

in which $R_1$, $R_2$, $R_3$, $R_4$ and $R_5$ are each selected from hydrogen, halogen and lower alkyl and in which $R_8$ is selected from hydrogen and lower alkyl, A is selected from straight-chain lower alkylene and branched-chain lower alkylene and $R_9$ and $R_{10}$ are each lower alkyl or $R_9$ and $R_{10}$ together with the nitrogen atom to which they are attached are selected from the group consisting of pyrrolidino, piperidino and azepino, and its nontoxic acid addition salts.

2. A biguanide derivative selected from the group consisting of 1 - (3-dibutylaminopropyl)-5-(3-phenyl-5-oxa-2,4-diazolyl)-biguanide and its non-toxic acid addition salts.

3. A biguanide derivative selected from the group consisting of 1-(5-diethylamino-2-pentyl)-5-(3-phenyl-5-oxa-2,4-diazolyl)-biguanide and its non-toxic acid addition salts.

4. A biguanide derivative selected from the group consisting of 1 - (3-dibutylaminopropyl)-5-(3-m.chlorophenyl-5-oxa-2,4-diazolyl)-biguanide and its non-toxic acid addition salts.

References Cited
UNITED STATES PATENTS 2,455,896   12/1948   Nagy _____ 260—293.67
3,338,899   8/1967    Aron-Samuel _____ 260—307 G JOHN D. RANDOLPH, Primary Examiner S. D. WINTERS, Assistant Examiner U.S. Cl. X.R.

260—293.67, 247.5 R, 268 H, 564 R, 293.87; 424—267, 248, 250, 272